March 12, 1940.   C. S. DEWEY, JR   2,193,395
PLASTIC MOLDING MACHINE
Filed April 6, 1938   2 Sheets-Sheet 1

Inventor,
Charles S. Dewey, Jr.
Offield Towle Hopr Scott & Poole, Attys.

March 12, 1940.  C. S. DEWEY, JR  2,193,395
PLASTIC MOLDING MACHINE
Filed April 6, 1938  2 Sheets-Sheet 2

Witness:
Chas. N. Komish

Inventor
Charles S. Dewey, Jr.
Offield Nehelpe Scott & Poole, Attys.

Patented Mar. 12, 1940

2,193,395

UNITED STATES PATENT OFFICE 2,193,395

PLASTIC MOLDING MACHINE

Charles S. Dewey, Jr., Chicago, Ill.

Application April 6, 1938, Serial No. 200,403

9 Claims. (Cl. 18—20)

This invention relates to improvements in machines for the automatic molding of plastic materials, and has for its principal object to provide an improved, simple and efficient mechanism of the character described, capable of producing a plurality of successive operations automatically in proper timed relation with each other.

A further object of the invention is to provide an improved form of molding mechanism including a movable work support carrying a plurality of co-operating die units thereon arranged to be successively engaged by a single high pressure ram only during the proper stage of the molding process whereby the molding apparatus can be made more economically than heretofore.

A still further object of the invention is to provide an automatic timing mechanism in conjunction with the high pressure ram for limiting the initial amount of pressure exerted on the dies for a predetermined period, then increasing the pressure of said ram for another predetermined period, and finally releasing the pressure on the said ram. This feature is of special advantage in the molding of materials of the synthetic resin type and similar chemical compounds, with which best results are obtainable by partially closing the dies under moderate pressure only for a predetermined period so as to permit what is known as a breathing period for the molded material before a higher pressure is finally applied to close the dies. It has been noted that this breathing period is of importance in promoting proper distribution of the molded material in the dies, permitting the escape of gases and thereby insuring solid molds of uniform quality.

Other objects and advantages of my invention will appear from time to time as the following description proceeds.

The invention may best be understood by reference to the accompanying drawings, in which Fig. 1 is a side view of a machine constructed in accordance with my invention, with parts shown in section and with electrical control parts shown diagrammatically.

Figure 1:
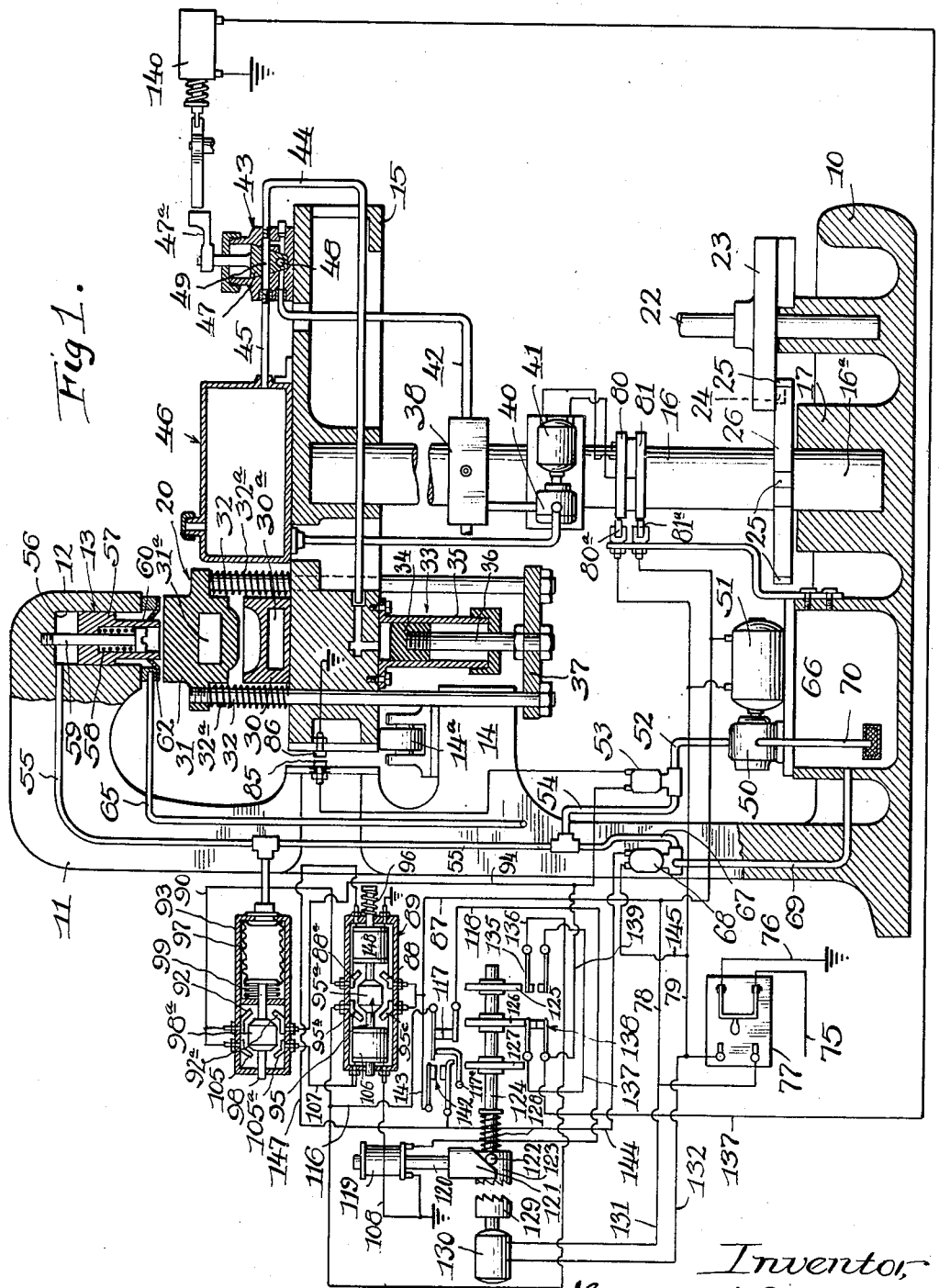
Figure 2:
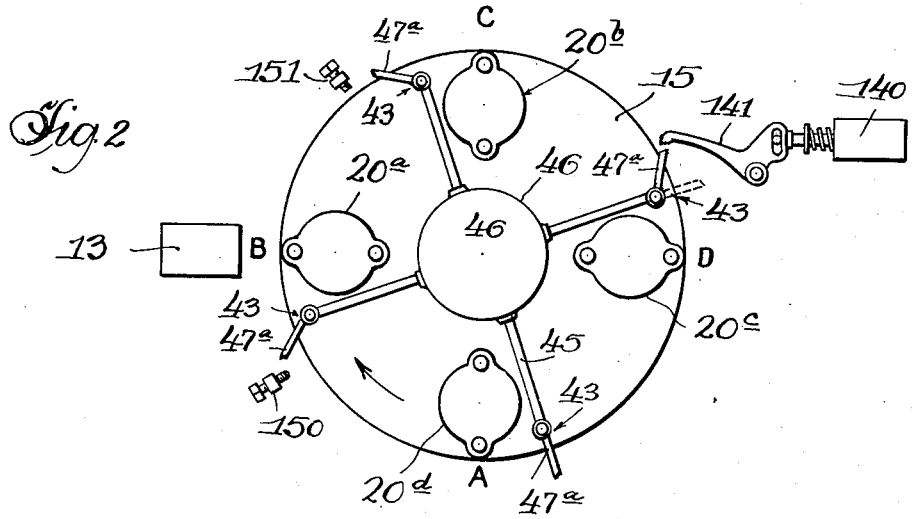
Fig. 2 is a detail plan view of the revolving work table with the superimposed parts removed therefrom.

Referring now to details of operation of the embodiment of my invention illustrated in Figs. 1 and 2, the machine includes a main base frame 10 and an upright standard 11 at one side thereof, having an overhanging arm 12 for supporting the high pressure hydraulic ram indicated generally at 13. A turntable 15 is mounted on an upright shaft 16 having its lower end 16a rotatably mounted in a bearing 17 in the base frame 10. The upright standard 11 is also provided with an intermediate arm 14 projecting below the edge of the turntable 15 and having a roller 14a thereon adapted to engage the bottom of the turntable and provide an auxiliary support therefor when the high pressure ram 13 is in operation, as will hereinafter more fully appear.

The turntable 15 is provided with a plurality of die units indicated generally at 20. As shown in Fig. 2, the machine herein illustrated has four such die units. It will be understood, however, that the number of such units may vary, depending upon the number of stops or stations desired to complete the molding process. Moreover, the size of the turntable may be increased so as to accommodate a plurality of overhanging arms 12 with their high pressure rams 13 located at suitable intervals about the turntable 15, and each serving a multiple series of die units 20.

Means are provided for rotating and indexing the turntable intermittently in relation to the high pressure ram, and thus place the several die units 20 successively into registering position beneath said ram. In the form shown, said indexing means consist of a Geneva movement of a well known form, including a power shaft 22 journalled at its lower end in the base frame 10 and having a wheel 23 thereon carrying drive pin 24 adapted to be successively engaged with lugs 25, 25 spaced at suitable intervals around a wheel 26 on the lower end of the turntable shaft 16.

Each die unit 20 includes a lower die support 30 suitably fixed on the top of the turntable 15 and a superimposed registering upper die support 31. Said die supports 30 and 31 may, as usual, have heating elements 30a and 31a adjacent their respective working faces to maintain the dies at the desired working temperature. The upper die support 31 is carried on guide rods 32, 32 which extend through the turntable 15 on opposite sides of the lower die support 30. The lower ends of the guide rods 32, 32 are connected to an auxiliary hydraulic ram 33 disposed beneath the turntable 15 and including a cylinder 35 and a piston 34 having a piston rod 36 connected at its lower projecting end with the lower ends of the guide rods 32, 32, as by means of a cross head 37.

This auxiliary ram 33 is employed to assist the high pressure ram, and also to hold the dies closed during certain stages of the molding operation, as will hereinafter more fully appear. It will be understood, of course, that each of the die units has an individual hydraulic valve, and in the arrangement illustrated in Figs. 1 and 2, the valve for each die unit is located at the opposite side of the turntable adjacent another die unit. This arrangement can be varied, however, as desired.

Hydraulic pressure is supplied to the auxiliary ram 33 from a pressure tank 38 connected to a pump 40, both herein shown as carried on the turntable shaft 16 beneath the turntable 15, together with an electric motor 41 for operating the pump. The pressure tank 38 has an outlet pressure pipe 42 communicating with a hydraulic valve 43 adjacent the periphery of the turntable 15. Said valve has a high pressure pipe 44 connected therewith leading to the auxiliary ram chamber 35, and a relief pipe 45 leading to a supply tank 46 mounted at the center of the turntable. A two-way valve member 47 is mounted in the valve casing 43 arranged so that in one position a port 48 in said valve member connects the high pressure pipe 42 with the pipe 44 leading to the auxiliary ram 35, and in another position the port is closed and a second port 49 is opened so as to relieve the pressure in auxiliary ram 35 through pipe 44 and relief pipe 45 to tank 46. The means for operating the valve mechanism just described will hereinafter more fully appear.

Referring now to the hydraulic system for operating the high pressure ram 13, a hydraulic pump 50 preferably of the constant pressure type is mounted on the base frame 10 and operated by electric motor 51. A high pressure pipe 52 leads through a solenoid control valve 53 and pipes 54 and 55 to the high pressure side of the ram cylinder 56. The piston 57 of the ram is movable downwardly in said cylinder against a compression spring 58 on anchor pin 59, the arrangement being such that when pressure is relieved from the ram the spring 58 will tend to return the ram to its uppermost position, as shown in Fig. 1. The lower end of the ram has a collar 60 which surrounds the spring 58 and anchor pin 59 and moves downwardly at the proper timed interval into engagement with the top face of the upper die support 31, as will hereinafter more fully appear. In the form shown, the depending collar 60 of the ram is surrounded by an annular closure plate 62 which engages its outer surface, and arranged so as to trap any oil that may leak beyond the piston 57, and drain such oil through pipe 65 which is led downwardly either to the oil sump 66 or to an exterior waste pipe.

Connected also to the high pressure pipe line 55 is a by-pass line 67 leading through solenoid valve 68 and pipe 69 to the sump 66. Oil is supplied to the pump 50 by a pipe 70 leading from adjacent the bottom of the sump tank 66.

The electrical connections for operating and controlling the pump motors 41 and 50 and the solenoid valves 53 and 68 will now be described. Electric power is supplied from any suitable source through conductor 75 and ground conductor 76 controlled by main switch 77. When switch 77 is closed, the main line conductors 78 and 79 are directly connected to the motor 51 to operate the same, and are also connected to the motor 41 through rings 80 and 81 and cooperating wipers 80ª and 81ª, respectively.

As each of the die units 20 is rotated into registering position beneath the ram 13, an insulated contact 85 on standard 11 is engaged by contact 86 carried by said die unit and grounded on the turntable 15. This closes a circuit from main line conductor 78, conductor 87, and a pair of contact elements 88, 88ª of a double solenoid switch 89. From the contact 88ª of the latter switch, conductor 90 leads to contacts 92 and 92ª of a hydraulic pressure-responsive switch 93. From the contact 92ª of the latter switch conductor 94 leads to solenoid switch 53, and from thence through contacts 85 and 86 to ground.

The double solenoid switch 89 has an armature 95 carrying contact member 95ª. A spring 96 normally tends to urge the contact member 95ª on said armature into engagement with the contacts 88 and 88ª.

The hydraulic pressure-responsive switch 93 is provided with an expanding bellows 97 and a plunger 98 connected therewith. A spring 99 is mounted on said plunger, and normally tending to hold the contact element 98ª on the plunger into engagement with contacts 92 and 92ª until the hydraulic pressure in pipe 55 is sufficient to overcome the spring 99.

With the portions of the electrical system above described, it will now be observed that as soon as the contacts 85 and 86 become engaged, a circuit is completed through the solenoid switch 53 so as to open the pipe line 55 and build up a pressure in the ram 13. The amount of pressure initially exerted on the ram, however, is limited by the operation of hydraulic pressure valve 93 which operates to close the solenoid valve 53 automatically as soon as the pressure on the ram reaches a predetermined value. When this occurs, the plunger 98 is moved so as to break the initial circuit through contacts 92 and 92ª, and permit the self-closing valve 53 to close. This action thus limits temporarily any further increase in the pressure exerted by the ram 13, although the initial pressure on the ram will be maintained during a predetermined time period to permit "breathing" of the mold. This breathing period is controlled automatically, as will now be described.

Operation of the plunger 98 of hydraulic switch 93 to the left completes another circuit from conductor 90, through contacts 105 and 105ª of said hydraulic switch, and from thence through conductor 107 to solenoid 106 of the double solenoid switch 89 and conductor 108 to ground. Solenoid 106 has sufficient capacity to overcome the normal pressure of spring 96 associated with the armature 95 of said switch, and shift said armature to the left so as to open the initial circuit through contacts 88 and 88ª. The same shifting movement closes the circuit between contacts 95ᵇ and 95ᶜ of said switch. This cuts out the hydraulic pressure switch 93 from any further controlling action, and the current from conductor 87 is now directed through conductor 116 through a normally closed contact switch 117 and conductor 118 to solenoid 119 to ground. The solenoid 119 operates a plunger 120 connected to a reciprocable pawl 121. Said pawl is normally dropped by gravity into an engaging position relative to a pin 122 on clutch collar 123. Said collar is slidably mounted on a shaft 124 which carries a plurality of timing cams 125, 126 and 127. By releasing the pawl 121 the clutch collar 123 is permitted to move under pressure of a spring 128 into engagement with clutch member 129 of motor 130. Said motor is connected with main line conductors 78 and 79 through branch conductors 131 and 132, so that it is operating continuously. The engagement of the clutch collar 123 with clutch member 129 therefore sets the timing cams 125, 126 and 127 into operation.

The timing cam 125 operates a contact switch 135 which is normally open when the timing cam 125 starts its rotation. One side of the switch 135 is connected by conductor 136 to the contact 95^b of solenoid switch 89. The other side of the switch 135 is connected by conductor 137 to one side of a contact switch 138 in position to be operated by the second timing cam 126 and normally closed by the latter. The opposite side of the contact switch 138 is connected by conductor 139 through conductor 94 to the solenoid valve 53. Said switch 138 is also connected through conductor 137 to solenoid switch 140 which controls the hydraulic valve 43 on the turntable, as will hereinafter more fully appear.

The third cam 127 controls contact switch 117 previously mentioned, as well as a contact switch 142, one side of which is connected by conductors 143 and 87 to the main line conductor 79 and the other side of which is connected by conductor 144 through solenoid valve 68 and conductor 145 to the main line conductor 79. The switch 142 is also connected through conductor 147 to solenoid 148 of the double solenoid switch 95 and thence to ground. Switch 117 is normally closed, while switch 142 is normally open. The arrangement is such that cam 127 directly engages a pivoted projection 117^a so as to open switch 117 just before closing switch 142. This insures completion of one cycle of operation of the timing mechanism before restoring the initial circuit connections through contacts 88 and 88^a of switch 89.

The operation of the machine above set forth through a complete molding cycle as applied to one of the die units may now be described with reference to Figs. 1 and 2. It may be assumed that the die unit 20 starts its cycle at station A which appears at the bottom of Fig. 2. In this position the dies are open, the corresponding hydraulic valve 43 at the top of Fig. 2 is open between the auxiliary ram 43 and the gravity tank 46, as shown in Fig. 1. The negligible hydrostatic pressure exerted on the hydraulic ram is overcome by the springs 32^a, 32^a which normally hold the upper die support 31 in raised position. As usual, heat is applied to the heating elements 30^a and 31^a in the two die supporting members. The die impression is loaded with the required amount of plastic material ready for the ramming operation.

The turntable is then rotated by the indexing mechanism in a clockwise direction so that the die unit 20 moves to station B (Fig. 2) where it is brought into registering position beneath the ram 13. The control circuit for the ram is then automatically closed by engagement of the electric contacts carried by the turntable opposite said die unit. The ramming operation thus initiated functions as follows:

The circuit connections are initially arranged so that closing of contacts 85 and 86 causes the solenoid valve 53 to open and admit pressure to the ram 13, and move the upper die toward closed position, putting the springs 32^a, 32^a under compression. During initial closing of the dies by the ram 13, the auxiliary ram cylinder 35 is supplied with liquid flowing by gravity from tank 46. The initial pressure exerted by the ram 13, however, is limited automatically by the pressure valve 93 which operates to break the circuit through the solenoid valve 53 and permit the latter to close as soon as a predetermined pressure has been applied to the ram. The pressure valve 93 also serves to complete another circuit through the solenoid switch 89 by which solenoid 119 is energized so as to cause rotation of the timing cam shaft 124 carrying cams 125, 126 and 127. The same operation of solenoid switch 89 then cuts out the pressure valve 93 from any further pressure limiting function with regard to the pressure on ram 13.

After solenoid valve 53 is closed, the pressure on the dies initially exerted by the ram will be maintained substantially constant (excepting for negligible leakage) as long as switch 135 remains open, unaffected by cam 125. During this initial time period, the plastic material is given sufficient time to breathe under its initial pressure in the mold. The length of this breathing period, of course, can be varied as desired, by changing the shape of cam 125.

During this initial breathing period cam 126 maintains switch 138 in closed position, cam 127 keeps switch 117 closed, and switch 142 remains open.

At the end of the breathing period cam 125 closes switch 135, thereby re-establishing a circuit through solenoid valve 53, and again opening said valve to permit additional pressure to be exerted by the ram 13. Closing of switch 135 also energizes solenoid 140 so that its lever arm 141 actuates control arm 47^a of hydraulic valve 43 from its full-line position shown in Fig. 2, to a dotted-line position. This movement closes the port 49 in the valve member 47, and opens the port 48 so as to permit the pressure from pressure tank 38 to be exerted on the auxiliary ram 33. The pressure of auxiliary ram 33 then supplements the high pressure ram 13 in fully closing the dies.

After maximum pressure has been applied to the dies by the ram 13, cam 126 permits the switch 138 to open, thereby cutting the circuit through the high pressure solenoid valve 53 and causing the latter to close. Cam 127 then permits switch 117 to open. This de-energizes the solenoid 119 and permits the pawl 121 to drop by gravity into position to engage the pin 122 on clutch sleeve 123. Due to the inclined engaging surface of said pawl, the clutch sleeve 123 is withdrawn from engagement with clutch member 129, after said sleeve has completed a single cycle of rotation. The timing cams are therefore stopped in their initial position ready for the next cycle of timing operation. During the last few degrees of rotation of cam 127, however, the pivoted piece 117^a which initially operates switch 117, is elevated further so as to close the switch 142. This completes another circuit through solenoid valve 68 so as to relieve the pressure on the ram 13 and permit drainage from line 55 through pipes 67 and 69 to the sump tank 66. The piston 57 of the high pressure ram 13 will then be returned to its initial elevated position by spring 58. Closing of the switch 142 also establishes a circuit through the solenoid 148 of double solenoid switch 89 so as to return the contact member 95^a of armature 95 to its initial position with the assistance of spring 96. This movement of the armature 95 re-engages contact member 95^a with contacts 88 and 88ª. At the same time, due to the release of pressure on the ram 13, the pressure valve 93 will also be restored to its initial condition, with its circuit connections ready for the next cycle of operation of the pressure control valve and the timing mechanism.

After completion of the high pressure ramming action above described, the turntable is then rotated automatically by its indexing mechanism so as to move the die unit 20 to its next station indicated at C on Fig. 2. It will be observed, however, that this rotation of the turntable does not affect the position of the control arm 47ª of hydraulic valve 43. Accordingly, the upper die member 31 will be maintained in closed position by its auxiliary ram 33 after the die unit has been moved from beneath the ram into one or more subsequent positions or stations. With this arrangement the dies are permitted to cure under heat and pressure for a predetermined period before the dies are opened and the molding or casting removed therefrom. The curing period may be continued through one or more stages of progression of the die units or until the die unit again reaches its initial position A where the molding is to be removed and the dies re-loaded.

In the preferred form shown in Fig. 2, means are provided for opening the dies gradually, commencing some time before the die unit 20 reaches its loading position, this gradual opening of the dies being desirable in order to prevent a too sudden opening of the dies by action of the compression springs 32ª, 32ª when pressure of the auxiliary ram is released.

Thus in Fig. 2 a preliminary stop or lug 150 is located at a suitable point adjacent the periphery of the turntable so as to engage the control arm 47ª of the hydraulic valve and move said arm only to a partially open or "cracked" position, as the valve 43 passes said stop. This will permit a gradual reduction of the holding pressure on the auxiliary ram. Finally just before the die unit is rotated to its original loading position A, the lever arm 47ª is engaged by a second stop 151 so as to move the valve 43 to fully opened position and thus relieve all holding pressure on the ram. After the dies are fully opened, the molding can be removed, and the dies cleaned and refilled for another cycle of operation.

Figure 3:
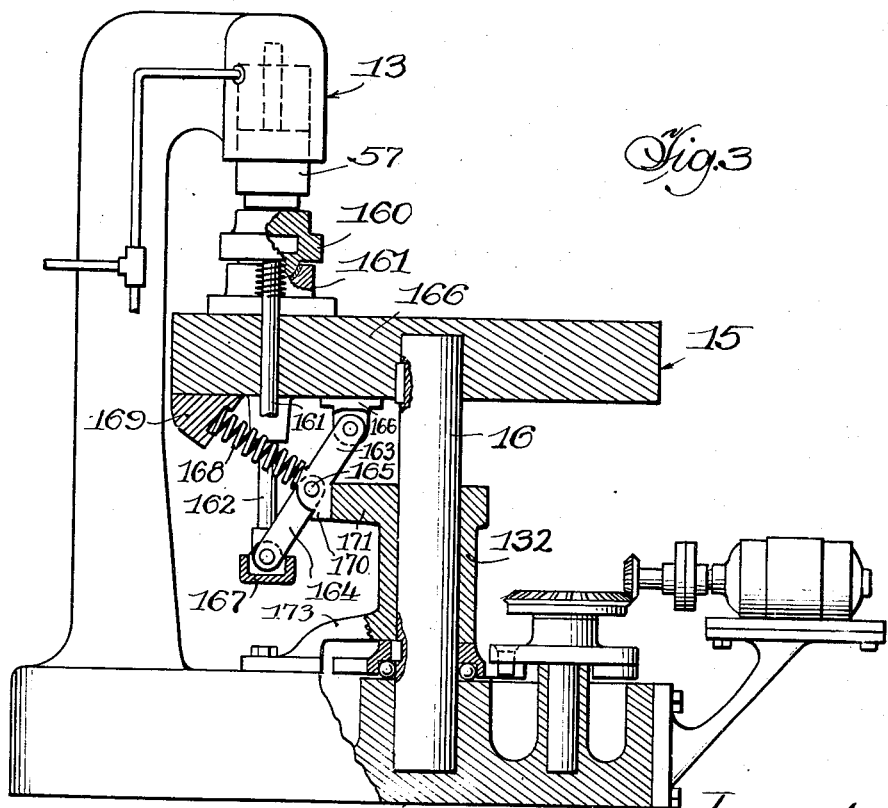
Fig. 3 is a side view in part elevation showing details of a modified form of my invention in which the movement of the dies is partially controlled mechanically instead of hydraulically as in the form of invention shown in Fig. 1.

In the modified form of apparatus shown in Fig. 3, the general arrangement of main frame 10, high pressure ram 13 and turntable 15 are substantially the same as illustrated in Figs. 1 and 2, but the hydraulic auxiliary ram 33 is replaced by a mechanically operated mechanism which may be described as follows:

The upper die support 160 has a pair of guide rods 161, 162 connected thereto and passing through turntable 15, but instead of having a hydraulic ram connected to the lower end of said guide rods, two toggle links 163, 164 are connected together on pin 165 between a depending lug 166 on the bottom of the turntable 15 and the cross head 167 which connects the two lower ends of the guide rods 161, 162. A compression spring 168 is interposed between a stop 169 adjacent the periphery of the turntable and the toggle links 163, 164 adjacent their center pivot pin 165 so as to tend to break the toggle joint in a downward direction toward the shaft 16 of the turntable. A stop 170 is provided at the end of one of said links, as for instance link 163, which stop is adapted to engage the under face of its companion link 164 to hold the links in locking alignment with each other, as shown in full lines in Fig. 3. The projection 170 on link 163 is also adapted to engage a cam member 171 which in the form shown is mounted on a sleeve 132 surrounding the turntable shaft 16, but held in rigid position by suitable means such as a bracket 173 connected to the base frame 10.

With the construction above described, the cam member 171 is so shaped that as the turntable 15 rotates the die unit with its upper die member 160 into registering position beneath the ram 13, the stop 170 on the toggle links rides to the highest point of cam 171 so as to lock the toggle links in extended position against the compression spring 168. The cam member 171 is arranged to maintain the toggle links in locked position after the ram 13 has completed its operation and the turntable has been rotated into one or more succeeding positions, or until it is desired to open the dies. At this point the cam member 171 is reduced in height so as to permit the spring 168 to break the toggle joint.

Among the advantages of the improved machine above described, and particularly the form shown in Fig. 1, including a hydraulically operated auxiliary ram, are the following:

By mounting the auxiliary ram with its hydraulic control mechanism and pump on the turntable 15, the pressure lines are connected directly to the auxiliary ram, thereby eliminating the moving joints with attendant difficulties of maintaining pressure by gaskets, glands and the like. Moreover, with this form of auxiliary ram, its cylinder is automatically filled for the most part by the operation of the high pressure ram 13 so that a pump of relatively small capacity can be used in conjunction with the auxiliary ram in order to hold the dies in closed position, after they have once been operated upon by the high pressure ram.

Although I have shown and described certain embodiments of my invention, it will be understood that I do not wish to be limited to details of construction shown and described, but that various changes and modifications may be made therein without departing from the spirit and scope of my invention as defined in the appended claims.

I claim as my invention:

1. In a machine for molding plastic materials, a high pressure ram, a work table, a plurality of die units on said table each having opposed die members, means for automatically moving said work table so as to position said die members successively in registering position with said ram to be closed by the latter, and an auxiliary ram on said table operatively connected to each of said die units to hold the latter in closed position under pressure after they have been actuated by said high pressure ram.

2. In a machine for molding plastic materials, a high pressure ram, a work table, a plurality of die units on said table each having opposed die members, means for automatically moving said work table so as to position said die members successively in registering position with said ram to be closed by the latter, and an auxiliary ram on said table operatively connected to each of said die units and arranged to exert closing action thereon coincidentally with said high pressure ram when the latter is in actuating relation with said die unit, and to hold said die members in closed position after said die unit is moved out of actuating relation with said high pressure ram.

3. In a machine for molding plastic materials, a high pressure ram, a work table, a plurality of die units on said table each having opposed die members, means for automatically progressing said work table so as to position said die members successively in registering position with said ram, control means for said ram for exerting in succession an initial limited pressure to partially close the die members, then an increased pressure to fully close said die members, and then releasing the pressure thereon, each of said die units having an auxiliary ram, means for automatically operating said auxiliary ram coincidentally with said high pressure ram sufficient to retain the die members under pressure in closed position, and means for automatically releasing the pressure on said auxiliary ram to open said dies during a successive stage of progression of said work table.

4. In a machine for molding plastic materials, a hydraulic ram, a work table, a plurality of die units on said table each having opposed die members, means for automatically progressing said work table so as to position said die members successively in registering position with said ram, a pressure line and a relief line connected to said ram, and automatic control means for said ram comprising electrically operated valves in said high pressure and relief lines, respectively, circuit connections for controlling said valves automatically actuated by the positioning of each die unit in registering position with said ram, and including a hydraulic pressure limiting switch responsive to the pressure in said pressure line to close said high pressure valve at a predetermined pressure, and timing means automatically set into operation by said pressure limiting switch and effective successively at predetermined timed intervals to cut out said pressure limiting switch and then to re-open said high pressure valve, and then to open said relief valve.

5. In a machine for molding plastic materials, a hydraulic ram, a work table, a plurality of die units on said table each having opposed die members, means for automatically progressing said work table so as to position said die members successively in registering position with said ram, a pressure line and a relief line connected to said ram, and automatic control means for said ram comprising electrically operated valves in said high pressure and relief lines, respectively, circuit connections for controlling said valves automatically actuated by the positioning of each die unit in registering position with said ram, and including a hydraulic pressure limiting switch responsive to the pressure in said pressure line to close said high pressure valve at a predetermined pressure, timing means automatically set into operation by said pressure limiting switch and effective successively at predetermined timed intervals to cut out said pressure limiting switch and then to re-open said high pressure valve, and then to open said relief valve, and an auxiliary ram associated with each of said die units and carried by said work table to hold said die members in closed position, control means for said ram actuated by said automatic timing means for exerting a closing pressure on said auxiliary ram, and means independent of said timing means for releasing the pressure on said auxiliary ram so as to open the die members during a successive stage of progression of said work table.

6. In a machine for molding plastic materials, a hydraulic ram, a work table, a plurality of die units on said table each having opposed die members, means for automatically progressing said work table so as to position said die members successively in registering position with said ram, a high pressure line and a relief line connected to said ram, and automatic control means for said pressure line comprising electrically operated valves in said high pressure and relief lines, respectively, circuit connections for controlling said valves automatically actuated by the positioning of each die unit in registering position with said high pressure ram, and including a hydraulic pressure limiting switch responsive to the pressure in said high pressure line to close said high pressure valve at a predetermined pressure, timing means automatically set into operation by said pressure limiting switch and effective successively at predetermined timed intervals to cut out said pressure limiting switch, then to re-open said high pressure valve, and then to open said relief valve, said timing mechanism also being operative when said relief valve is finally opened, to cut in said hydraulic pressure switch and restore said circuit connections associated therewith for another cycle of operation of said timing mechanism.

7. In a machine for molding plastic materials, a ram, a work table, a plurality of die units on said table each having opposed die members, means for automatically moving said work table so as to position said die members successively in registering position with said ram to be closed by the latter, each of said die units having an auxiliary hydraulic ram associated therewith, to hold their respective die members in closed position after they have been actuated by said first mentioned ram, and pressure supply means for said auxiliary rams mounted on and carried by said work table.

8. In a machine for molding plastic materials, a frame, a work table, a plurality of die units on said table each having opposed die members, a high pressure ram and pressure supply means therefor on said frame, means for automatically moving said work table so as to position said die members successively in registering position with said high pressure ram to be closed by the latter, each of said die units having an auxiliary ram associated therewith of substantially less capacity than said high pressure ram, to hold their respective die members in closed position after they have been actuated by said high pressure ram, and pressure supply means for said auxiliary rams mounted on and carried by said work table.

9. In a machine for molding plastic materials, a ram, a work table, a plurality of die units on said table each having opposed die members, means for automatically progressing said work table so as to position said die members successively in registering position with said ram, control means for said ram for exerting in succession an initial limited pressure to partially close the die members, then an increased pressure to fully close said die members, and then releasing the pressure thereon, and an auxiliary ram movable with each of said die units and operable coincidentally with said ram to retain each of said die units in closed position after they have been moved out of actuating relation with said ram.

CHARLES S. DEWEY, Jr.